United States Patent [19]

Brown

[11] 3,804,982

[45] Apr. 16, 1974

[54] DATA COMMUNICATION SYSTEM FOR SERIALLY TRANSFERRING DATA BETWEEN A FIRST AND A SECOND LOCATION

[75] Inventor: Frederick W. Brown, Austin, Tex.

[73] Assignee: Texas Instruments Incorporated, Dallas, Tex.

[22] Filed: Aug. 10, 1972

[21] Appl. No.: 279,606

[52] U.S. Cl. ........... 178/69.5 R, 179/15 BS, 328/72
[51] Int. Cl. ........................................... H041 7/00
[58] Field of Search ............ 178/69.5 R; 179/15 BS; 328/72

[56] References Cited

UNITED STATES PATENTS 3,390,232 6/1968 Jager et al..................... 178/69.5 R
3,587,043 6/1971 Mangani....................... 178/69.5 R

*Primary Examiner*—Robert L. Richardson
*Attorney, Agent, or Firm*—Texas Instruments Incorporated

[57] ABSTRACT

A data communications system has capacity for serially transferring data between a first and a second location. There is a transmitter at the first location with the transmitter capable of storing data prior to transmission. A series of clock pulses is generated having a duty cycle less than one-half. The data and the clock pulses are modulo two serially added to produce a transmitted data stream. There is a receiver at the second location. The receiver receives the transmitted data stream and obtains from the data stream bit synchronization and data.

9 Claims, 12 Drawing Figures

DATA COMMUNICATION SYSTEM FOR SERIALLY TRANSFERRING DATA BETWEEN A FIRST AND A SECOND LOCATION

This invention is directed to a data communication system and more particularly to a data communication system for serially transferring data between the first and second location.

In any data communication system data must be transferred between two locations. In any serial data communication transfer system three pieces of information must be transmitted in the serial data train. These pieces of information include the bit sync information, the character or word sync information and the data to be transferred.

It is therefore an object of this invention to provide a new and improved serial data transfer system having bit sync information.

It is another object of this invention to provide a new and improved serial data transfer system having character or word sync information.

It is another object of this invention to provide a new and improved serial data transfer system having a bit sync information, character or word sync information and including the data to be transferred.

In the drawings, FIG. 1 shows a block diagram of the transmitter for use in the data communication system.

Figure 1:
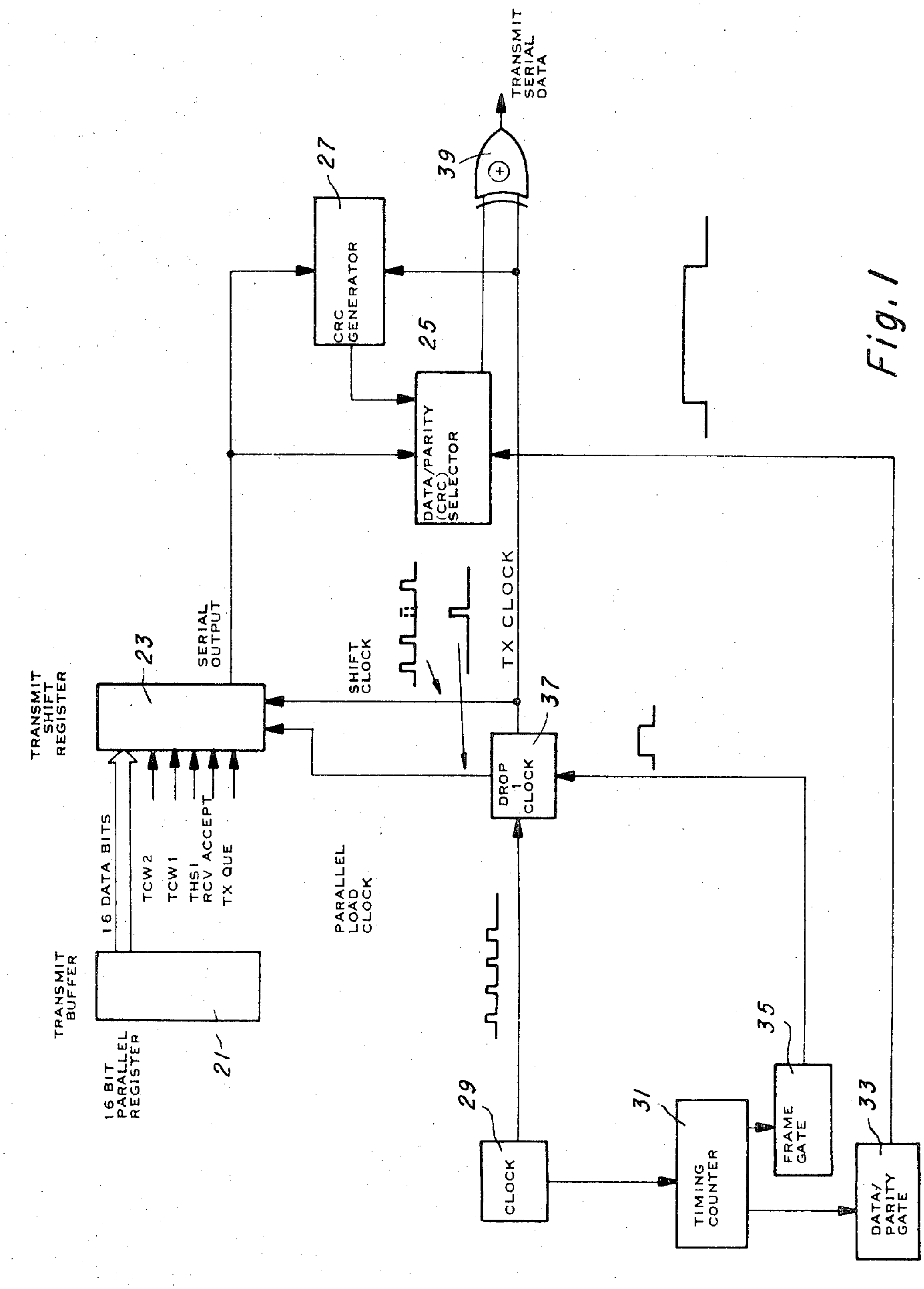
Figure 2:
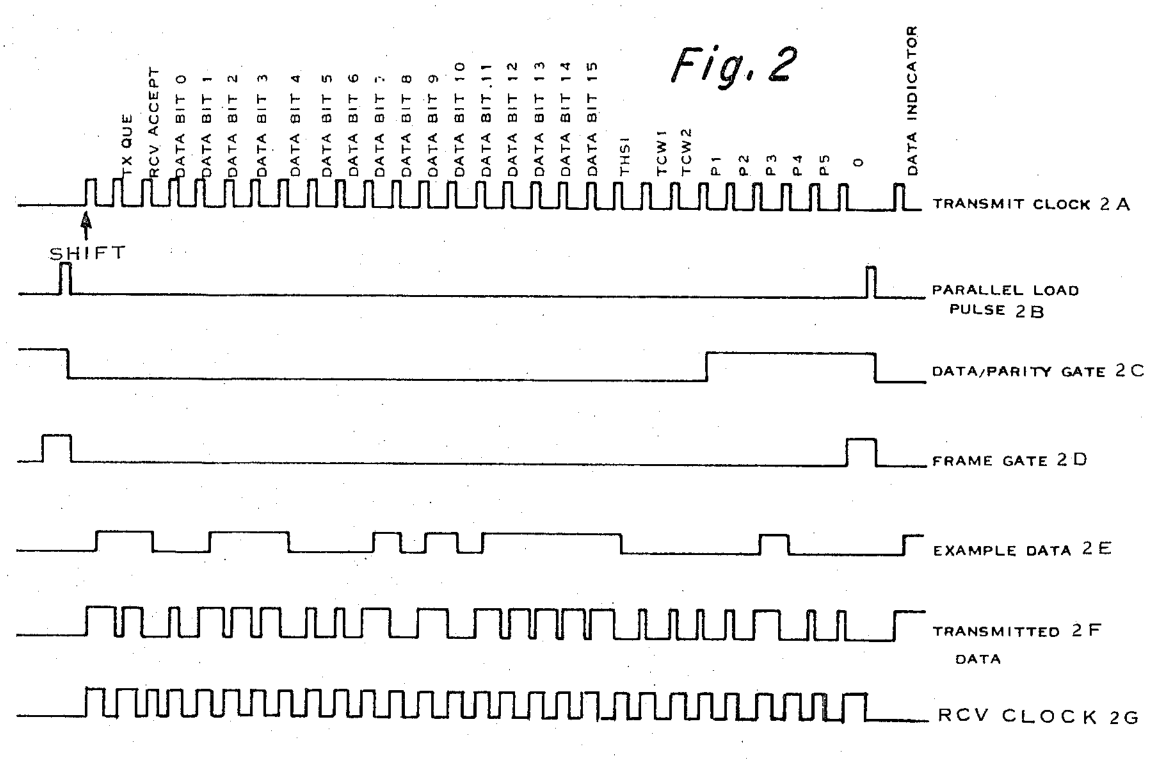
FIG. 2 shows the transmit and receive timing signals.

Referring now to FIG. 1 the transmitter receiver is for local communications of distances up to approximately 2 miles over any kind of balanced line. It will take parallel data transmitted serially and after being received will convert it to parallel data again. The transmit buffer 21 is first loaded in aprallel with the data to be transmitted. Upon command the parallel data is shifted from the transmitter buffer 21 to the transmit shift register 23 along with control flags. The control flags are TCW2 (control word 2), TCW1 (control word 1), THS1 (handshake inhibit) RCV accept (accept to the next unit), TXQUE (queue to the next unit). These control flags are control bits which tell the receiver what word is being transmitted and what to do with it. The control flags do not form part of this invention and will not be discussed further. After the transmit shift register 23 has been loaded the data is transmitted out in a serial output to the data/parity selector 25 and the CRC generator 27. Clock 29 is a clock which generates pulses at a selectable rate. The duty cycle of the clock pulse cycle is between a quarter and one-third. The clock can operate at a 1.33 megabit, a 1 megabit, or a 4 megabit rate. The output from clock 29 is counted in a timing counter 31 and after 23 pulses have been counted by the timing counter 31 the data/-parity gate 33 is gated on to select in the data/parity selector 25 the CRC generator 27 output. Five counts later on at the 28th pulse the frame gate 35 will be turned on to gate out one pulse through the drop one clock gate 37 from the clock 29. Thus, after 28 clock pulses, the drop one clock pulse 37 will gate out one pulse. This pulse output from the drop one clock gate 37 is used to load the transmit shift register 23 from the transmit buffer 21 and indicate the end of a transmittal of a word in a manner to be described. This pulse is shown in FIG. 2B. The output from the clock pulse 29 is applied through the drop one clock gate 37 to the transmit shift register 23 as shown in FIG. 2A, and used to shift the data out of the transmit shift register 23. The transmit clock pulse is also applied to the CRC generator 27 to generate a parity and shift the data word and parity out of the CRC generator 27.

During the serial shift of the data word from the transmit shift register 23 the CRC generator 27 generates a five bit parity word. At the conclusion of the generation of the parity word in the CRC generator 27, the parity word will be transferred to the data/parity selector 25 and then transmitted following the transmittal of data. The exclusive OR circuit 39 carries out a modulo two add (also termed exclusive OR operation). The output from the data/parity selector 25 and the output from the drop one clock gate 37 are applied to the exclusive OR circuit 39 so that the exclusive OR circuit 39 performs an exclusive OR operation upon these two inputs. The output from the data/parity selector 25 is the data, the control flags and the parity word as shown in FIG. 2A. The pulse train shown in 2A shows the pulses and the corresponding positions of the data, the control flags and the parity bits as they are applied to exclusive OR circuit 39. FIG. 2E shows an example data train applied from the output of the data/parity selector 25 to one input of the exclusive OR circuit 39. Taking the example data 2E and applying it to one terminal exclusive OR circuit 39 with the transmit clock pulse train (FIG. 2A) applied to the other terminal the output will be the transmitted data shown in FIG. 2F. Exclusive OR circuit 39 performs according to the truth table that unlike inputs will result up output (or a one) and two similar inputs result in zero or a down signal output.

The problem in receiving data is to get a bit sync on the received data. Using this invention a transistion edge is guaranteed in the output when there is a leading edge of the transmit clock (FIG. 2A) coincidental with transmitted data (FIG. 2F). The shifting is carried out on the trailing edge of the clock pulse while the transmission is carried out on the leading edge of the clock pulse. Note that as shown in FIGS. 2A and 2E the sample data is always displaced one clock pulse because the sample data has not yet been shifted from register 23 to the data/parity selector 25. The example data (shown in 2E) is actually shown displaced one clock pulse width from the clock pulse (FIG. 2A) and after being shifted from the transmit shift register 23 through the data parity selector 25 will then be exclusive ORed with the clock which produced the shift. This is because the clock pulse has already enabled one input of the exclusive OR circuit 39 and then the leading edge of the example data will be exclusive ORed with that same clock pulse. The transmitted data shown in FIG.

2F contains the information in the example data synced with the transmit clock pulses and it also contains a frame sync by the absence of the clock pulse gated out by the drop one clock gate 37. The pulse that was gated out is that shown in FIG. 2B. There is an edge in the transmitted data train 2F for every clock pulse time except for the time that the parallel load pulse 2B is shown. The receiver will note the absence of this clock pulse and thus determine that there is an end to the word which has been transmitted. Thus in the data transmitted train (FIG. 2F) there are three items of information: the data itself, the bit sync, and the frame sync showing that there is an end to the word of information transmitted.

The data has all been transmitted including the data itself, the control flags and the parity word.

RECEIVER

In the transmitter the duty cycle of the clock pulses was between a quarter and a third. In the receive mode the duty cycle is one-half. The duty cycle is the relationship between the time that the clock pulse is on as opposed to total cycle time of the clock pulse. Thus in FIG. 2A the time that the clock pulse is on is about one-third of the total cycle time. In the receiver the clock pulse will be on one-half of the total cycle time as shown in FIG. 2G.

Figure 3:
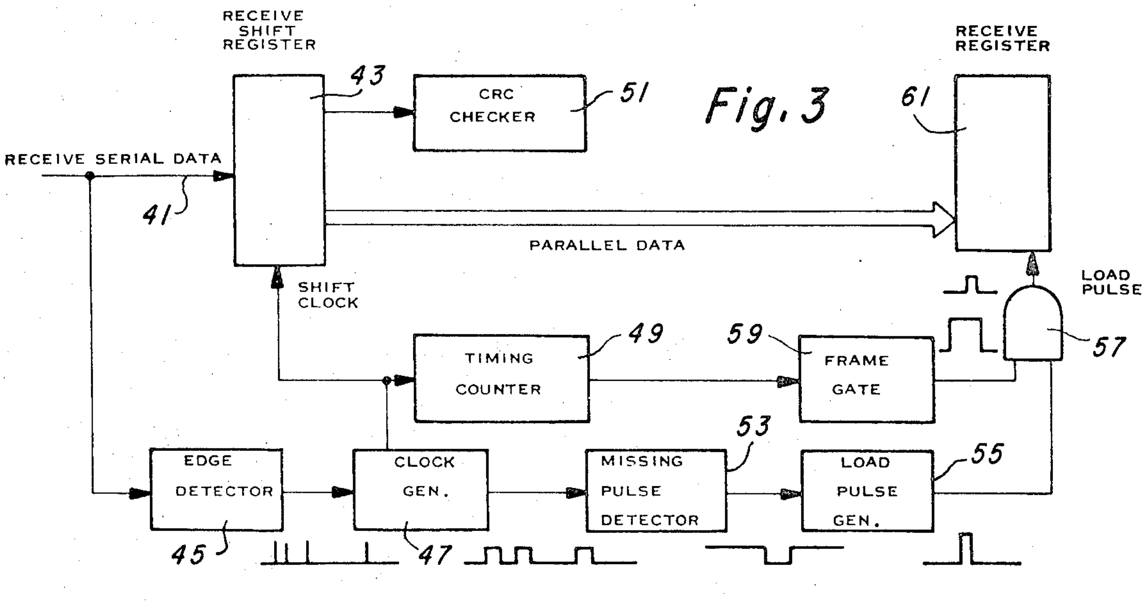
FIG. 3 shows the receiver for the data communication system.

Now referring to FIG. 3, the transmitted data transmitted from exclusive OR circuit 39 in FIG. 1 is received on the receive serial data input line 41 and applied both to the receive shift register 43 and the edge detector 45. The edge detector 45 will detect every transistion of the input data shown in FIG. 2F. The edge detector 45 will apply its detected edges to the clock generator 47 which is a non-retriggable oneshot which will generate a receive clock with a half duty cycle. The receive clock pulses are used to shift into the receive shift register 43 the data received on the receive serial input line 41. The clock generator 47 generates a clock pulse as shown in FIG. 2G. Thus the clock pulse generator 47 takes the result of the edge detector 45 and generates a clock pulse only when the edge detection detects a transistion separated by greater than one-half a clock period. The input data shown in 2F is shifted in the receive shift register 43 by applying the receive clock pulses (FIG. 2G) to the receive shift register. At the same time the timing counter 49 will count the receive clock pulses produced by the clock generator 47. The CRC checker 51 will check the parity bits received in the receive shift register 43. The missing pulse detector 53 will check the receive clock pulses from the clock generator 47 and when it finds a missing pulse in the receive clock pulse train load pulse generator 55 will apply a signal AND circuit 57. The timing counter 49 will count up to 28 clock pulses received and when 28 clock pulses are received the frame gate 59 will also apply a signal to AND circuit 57. Thus the load pulse AND circuit 57 has a signal from the missing pulse detector 53 and the timing counter 49 applied to it so that a load pulse is applied to the receive register 61 to transfer the contents of the receive shift register 43 to the receive register 61 only if the frame is of proper length. This will complete the receipt of the information from the transmitter.

Figure 4A:
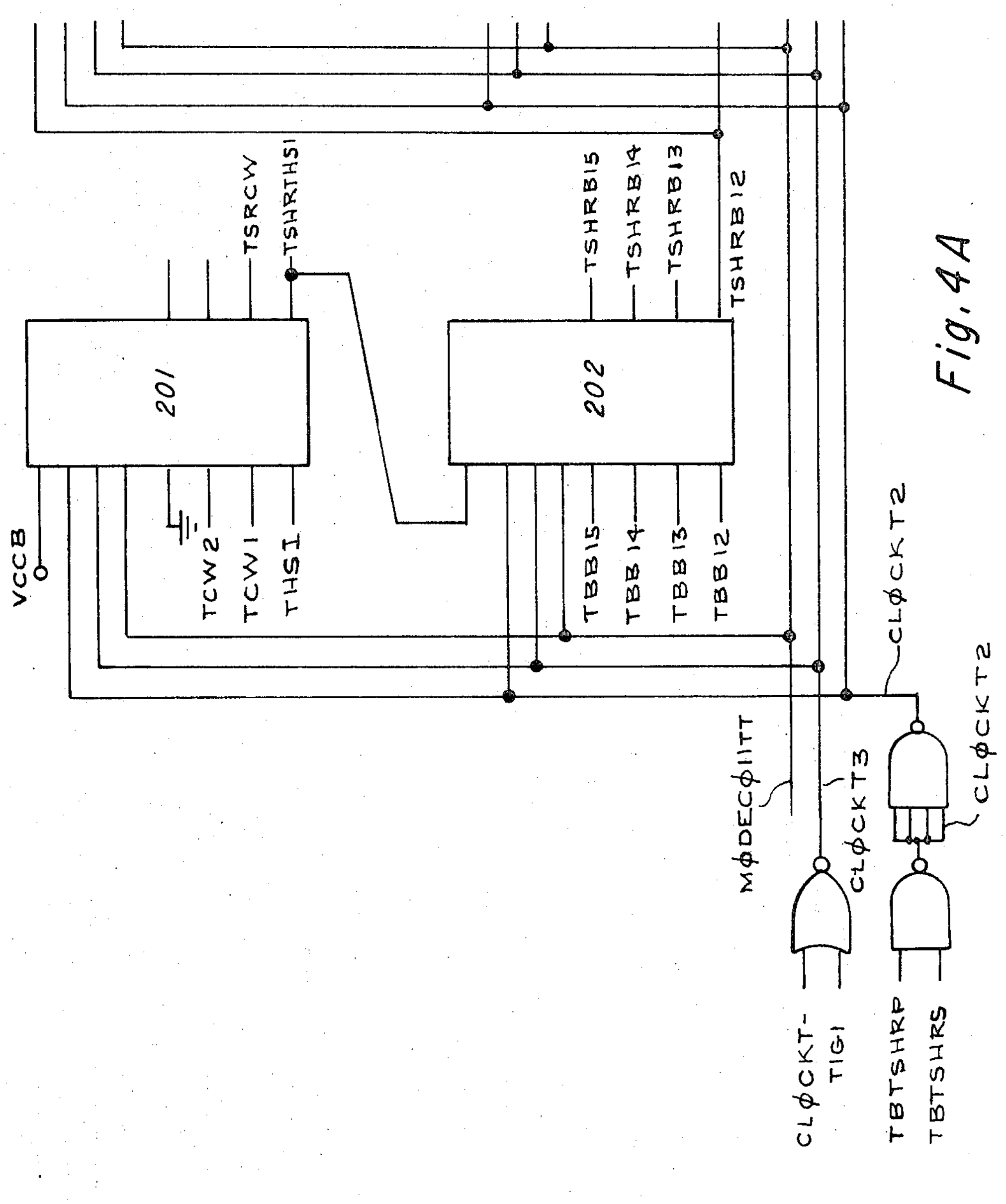
FIGS. 4A and 4B are detailed diagrams of the transmit shift register used in the system.
Figure 4B:
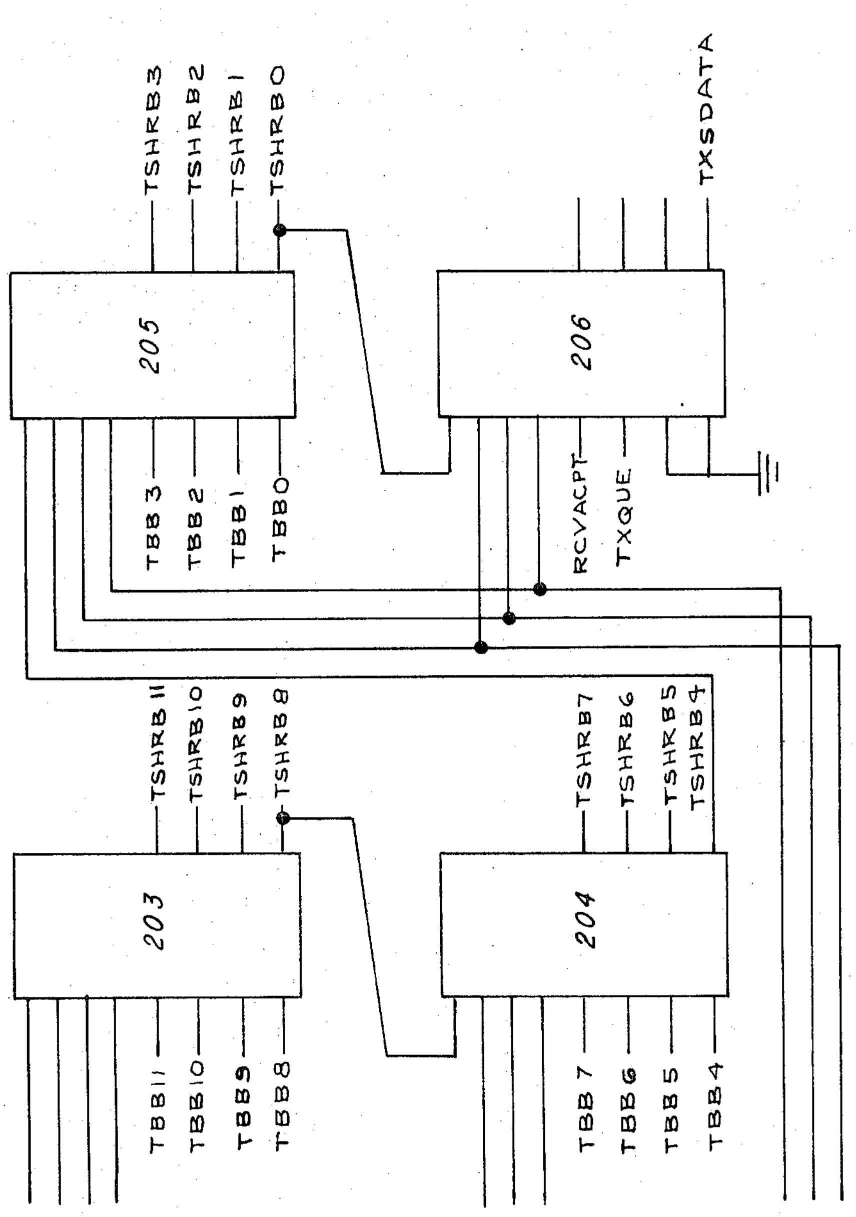

Now referring to FIG. 4 the transmit shift register 23 is a 22 bit shift register with six Texas Instruments' SN7495N integrated circuits. The inputs come from the transmit buffer 21 and are as labled. The gating from the clock 29 are shown with NOR circuits 207 and 208 and AND circuit 209.

Figure 5A:
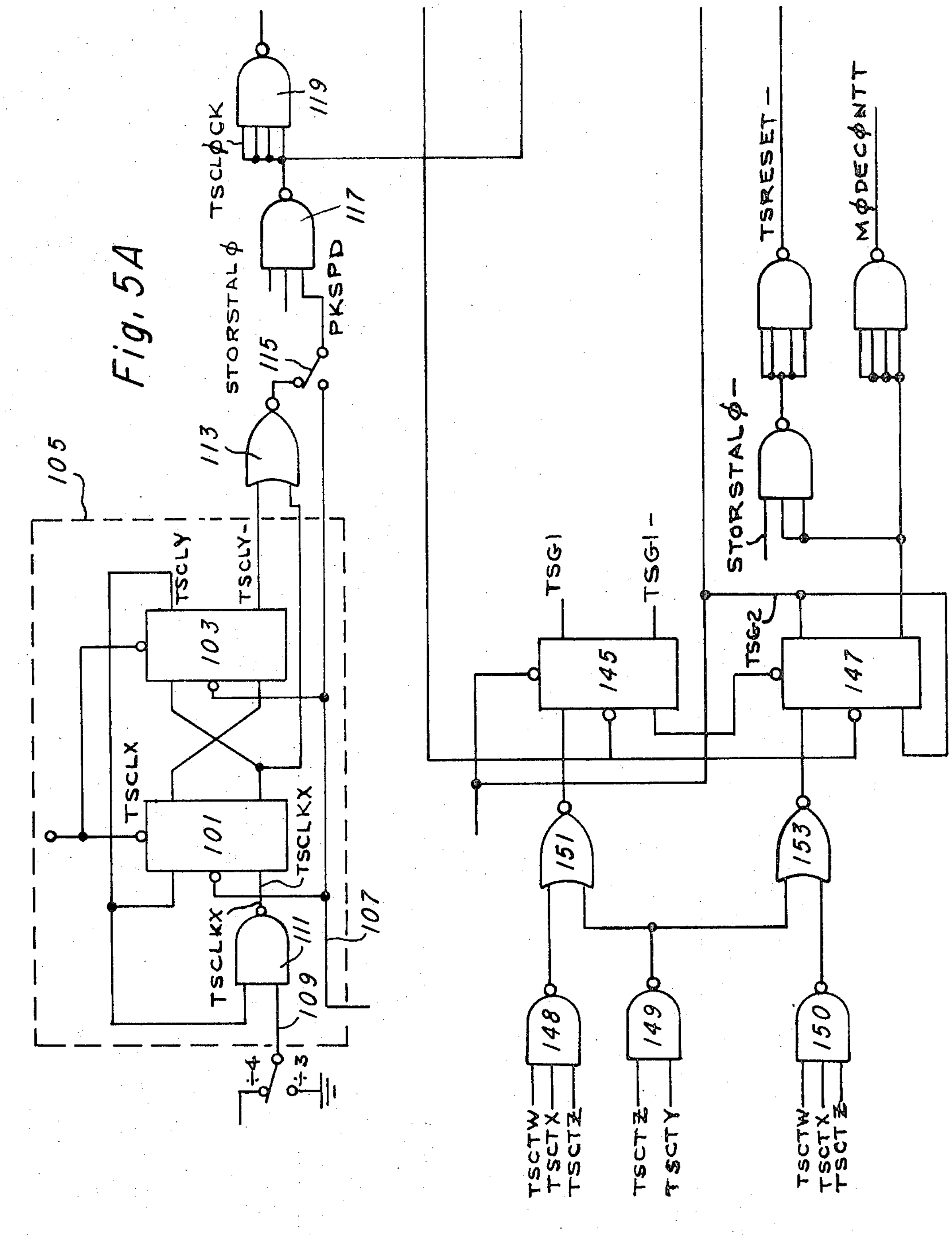
FIGS. 5A and 5B are diagrams of the logic and control used in the transmitter of the data communication system.
Figure 5B:
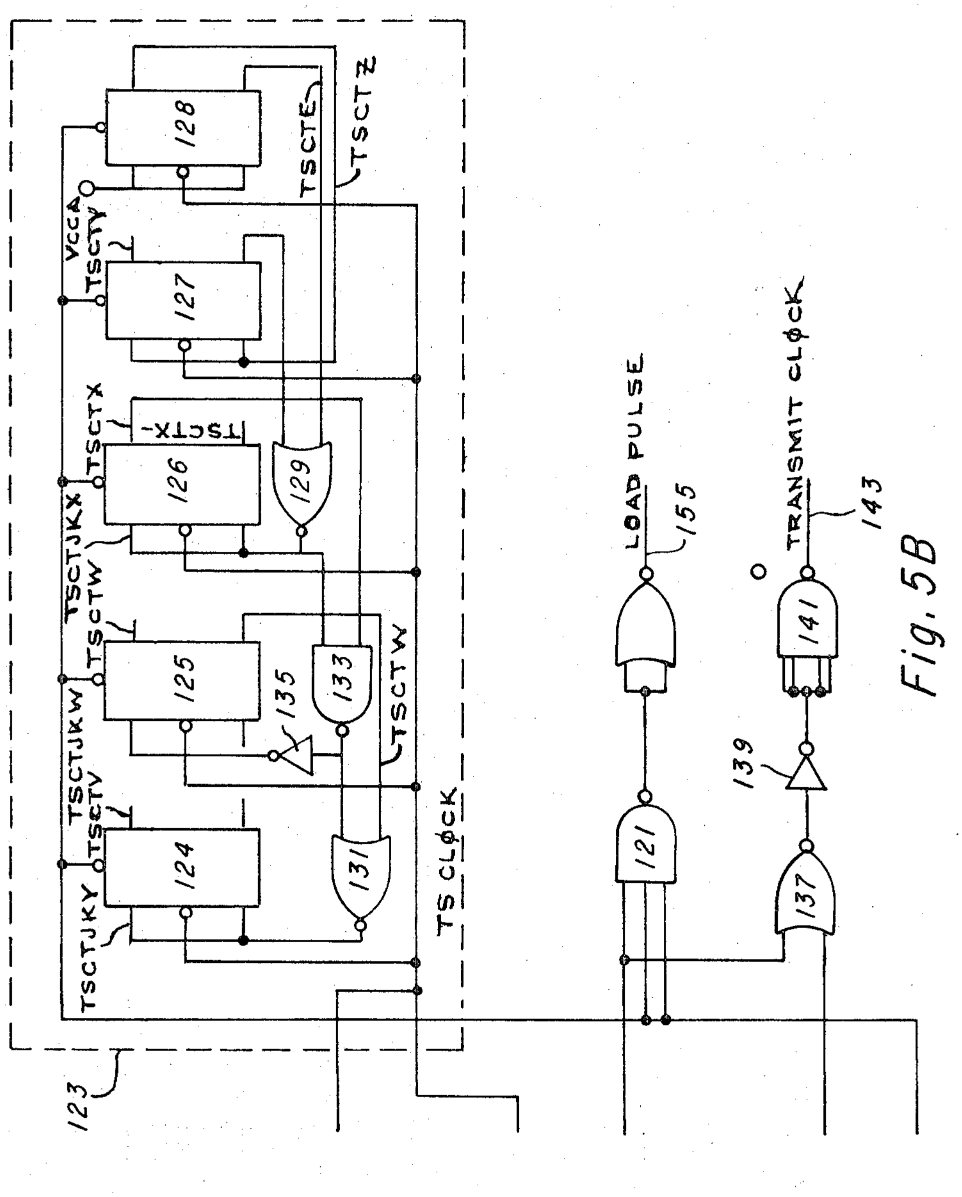
Figure 6:
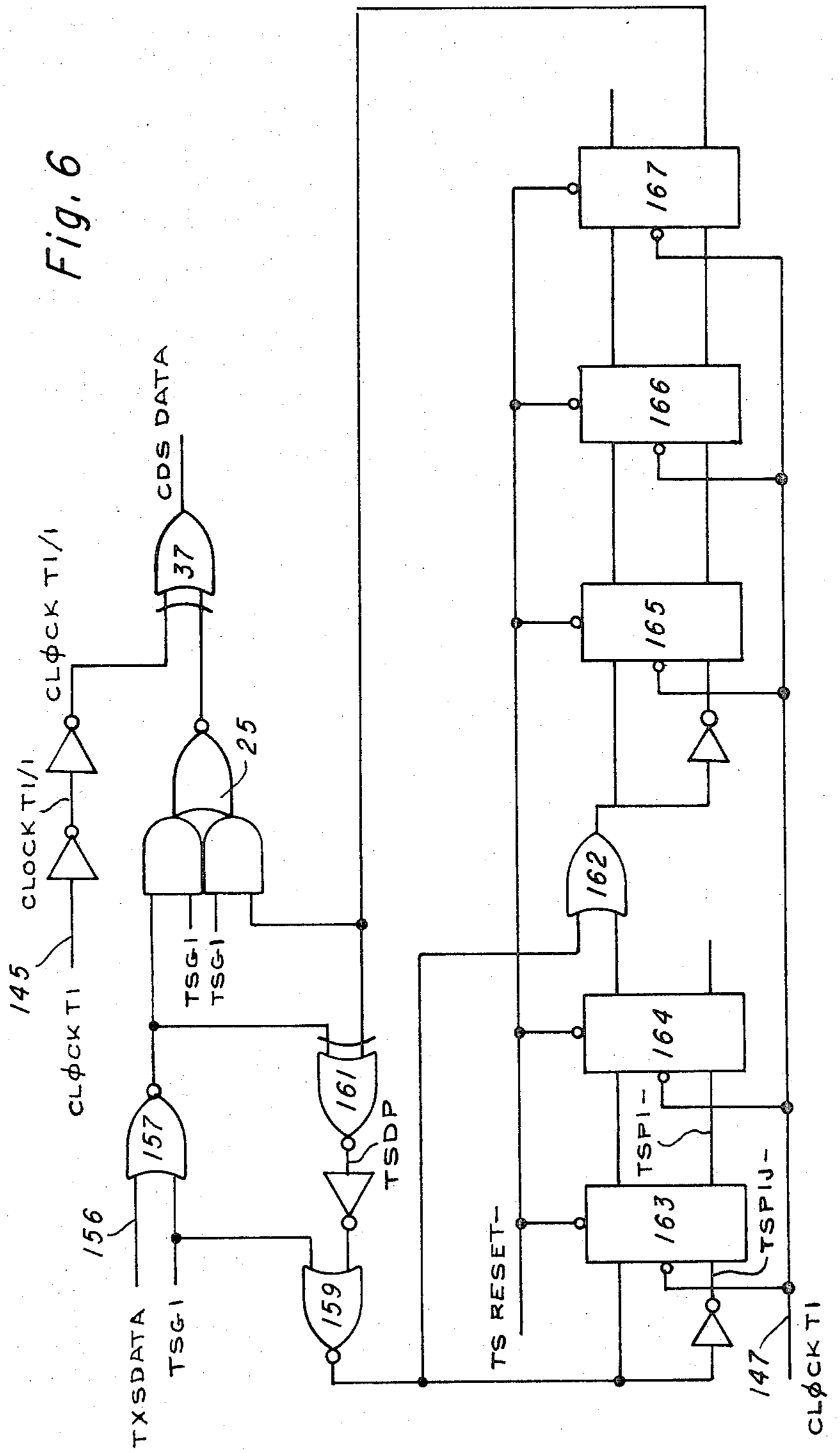
FIG. 6 shows the parity bit generator.

The diagram for the logic transmit serializer is shown in FIG. 5. The clock generator 105 is a divide by three or divide by four counter with the switch 109 connected to ground for a divide by three and connected to a one for a divide by four. The counter 105 consists of two flip flops 101 and 103 connected as shown with an input NAND circuit 111. A 4 megabit signal is applied to input terminal 107. The output from clock 105 is taken from AND circuit 113 applied to switch 115. Switch 115 may be switched between the output from the counter 105 or directly to the four megabit input signal 107. The output of the switch is applied to NAND circuit 117. The output of NAND circuit 117 is applied to the input of NAND circuit 119 and also to the input of NAND circuit 121. The output of NAND circuit 119 is also applied to the timing counter 123. Timing counter 123 consists of flip flops 124–128 connected as shown, NOR gates 129 and 131, NAND circuit 133, and inverter 135. The data parity gate is flip flop 145 and the frame gate is flip flop 147. The timing counter 123 is decoded by NAND circuits 148, 149 and 150. The outputs from the NAND circuits 148 and 149 applied to NOR circuits 151 and 153. The outputs of the NOR circuits 151 and 153 are applied to flip flops 145 and 147 respectively. During the time that the frame gate 147 is inhibited, the output terminal 143 will transmit out the clock pulse shown in FIG. 2A. When the frame gate 147 is not inhibited the output from terminal 155 will gate out the load pulse shown in FIG. 2B. The CRC generator is shown in FIG. 6. The input to the CRC generator is applied on terminal 156 which is the output of the shift register shown in FIG. 4. The CRC generator consists of NOR gate 157, NOR gate 159, exclusive OR circuit 161 and 162, and flip flops 163–167. The data parity selector is a gate 25 as shown in FIG. 1 with its output applied to exclusive OR circuit 39 along with the clock pulse 145. This operates in the same method as shown and described with FIG. 1.

Figure 7A:
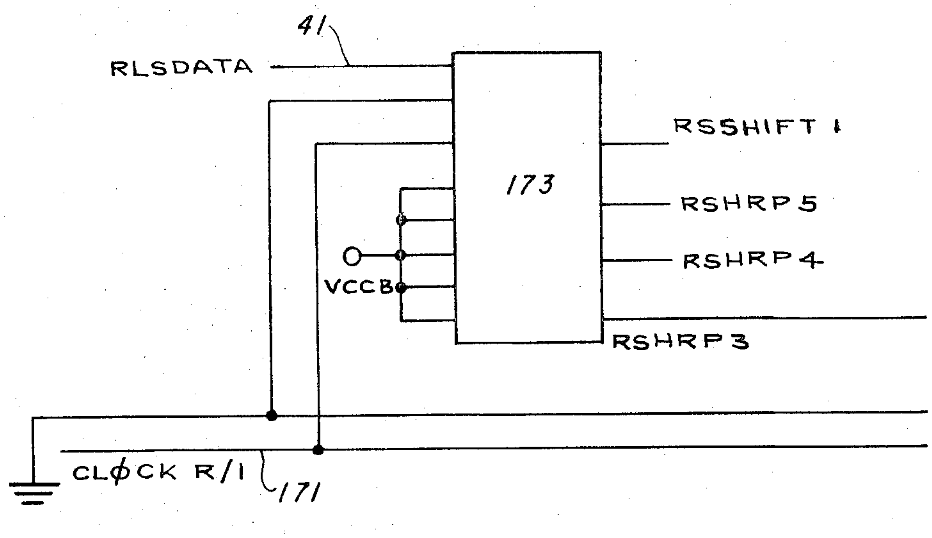
FIGS. 7A and 7B show the receiver shift register in the transmitter.
Figure 7B:
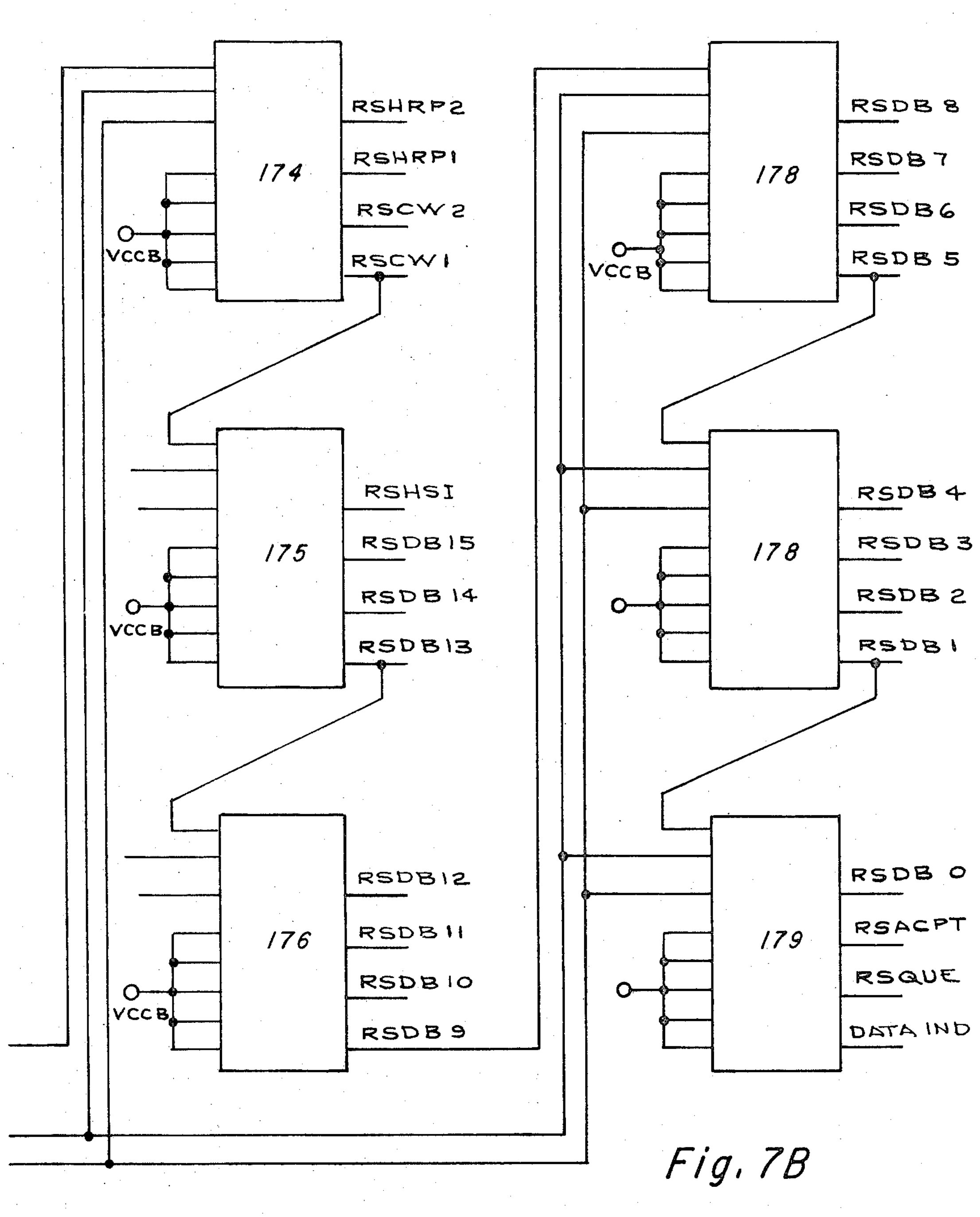

The receive shift register 43 is shown in FIG. 7. Receive shift register 27 receives the data on input terminal 41. The clock pulse from the clock generator 47 is received on terminal 171. The receive shift register 47 consists of seven Texas Instruments integrated circuits SN7495N 173–179. The data is shifted into the shift register in a serial manner, and loaded into the receiver register 61 in parallel.

Figure 8:
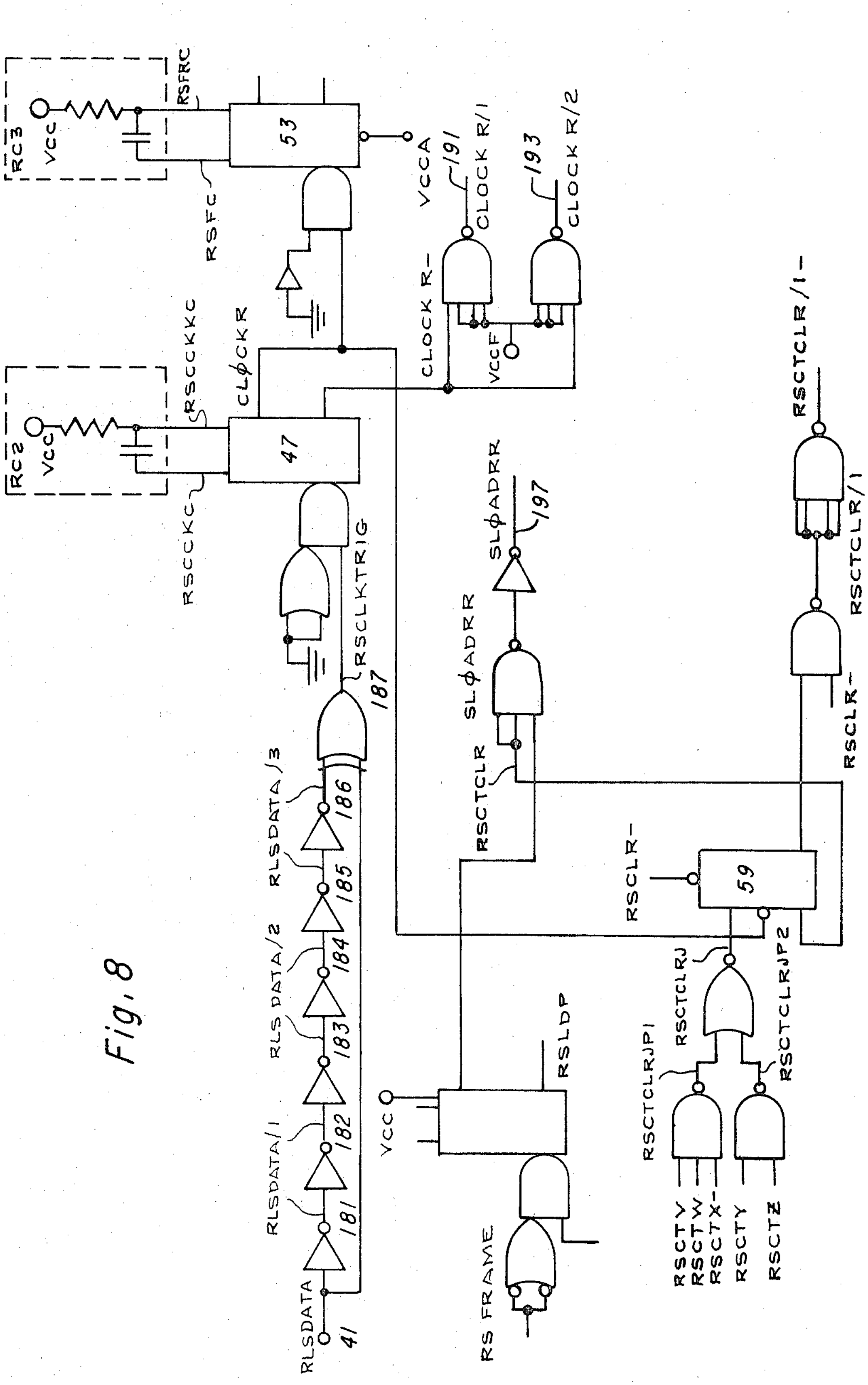
FIG. 8 shows the control logic in the receiver used in the data communication system.

Now referring to FIG. 8 for a description of the receive deserializer logic and receive serial data is received on input terminal 41. The edge detector 45 consists of six inverters 181–186 and an exclusive OR circuit 187. The edge detector operates in a known fashion to detect the edges. The clock generator 47 is a standard non-retriggable one-shot Texas Instruments integrated circuit SN74121N. The output from one-shot 47 is a clock pulse output (FIG. 2G) which is applied from output terminal 191 to input terminal 171 in FIG. 7. The clock pulse output on output terminal 193 is applied to the timing counter 47 shown in FIG. 9. The missing pulse detector 53 is a retriggable one-shot TI SN74123N. The output from missing pulse detector 53 is the frame pulse applied to the load pulse generator 55 (TI SN74121N). The output from the load pulse generator 55 is applied to AND circuit 195.

Figure 9:
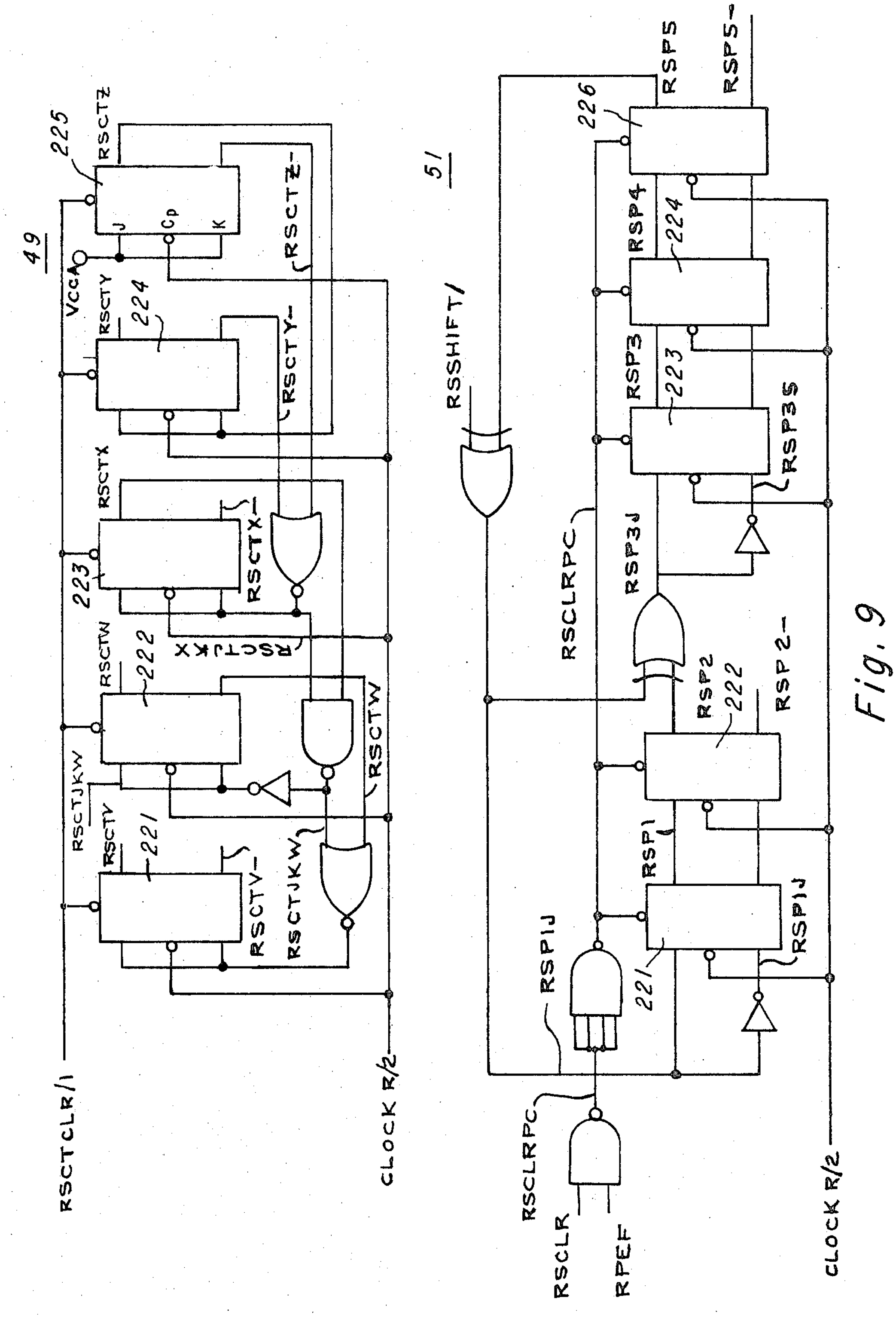
FIG. 9 shows the timing counter and the parity bit checker.

The frame gate 59 receives an input from the timing counter 49 which is shown in FIG. 9. The inputs to the frame gate 59 decode the output of the timing counter 49. The output from the frame gate 59 is also applied to AND circuit 195 to apply a load pulse on output terminal 197 to receive register 61 (not shown in detail), so that the received data is transferred from the receive shift register to the receive register 61.

FIG. 9 shows the timinig counter 49 which consists of four flip flops 221–225 and control circuitry. The outputs from the timing counter are decoded by the inputs to the frame gate 59 as shown in FIG. 8. The CRC checker 51 is shown in FIG. 9 and operates as shown consisting of five flip flops 231–235 with associated controls.

What is claimed is:

1. A data communication system for serially transferring binary data between a first and second location comprising:

*a*. transmitting means at said first location, said transmitting means including means for storing said binary data prior to transmission, clock means for generating a series of pulses having an on-time of less than one-half of the total cycle time, and exclusive-OR means for modulo two serially adding bits of said binary data and said clock pulses to produce a transmitted data stream, and

*b*. receiving means at said second location including means for receiving said transmitted binary data stream and means for obtaining bit synchronism from said transmitted binary data stream.

2. The data communication system claimed in claim 1 wherein said transmitting means includes means for inhibiting a clock pulse after a word of said binary data is transmitted and said receiving means includes means for detecting the absence of said inhibited pulse to indicate the end of a word transmission.

3. A data communication system for serially transferring binary data between a first and second location comprising:

*a*. transmitting means at said first location, said transmitting means including means for storing said binary data prior to transmission, clock means for generating a series of pulses having an on-time of less than one-half of the total cycle time, and exclusive-OR means for modulo two serially adding said binary data and said clock pulses to produce a transmitted binary data stream, and

*b*. means for receiving said transmitted data stream at said second location including means for detecting edges of said transmitted data stream, a clock generator responsive to said edge detector for generating clock pulses having an on-time of at least one-half the total cycle time, a shift register and means responsive to said clock pulses generated by said clock generator for shifting data from said transmitted data stream into said shift register.

4. The data communication system claimed in claim 3 including means in said transmitting means for inhibiting one of said clock pulses after a word of binary data has been transmitted and means in said receiving means for detecting the absence of said inhibited pulse to indicate the end of a word transmission.

5. The data communication system claimed in claim 3 wherein each word of data consists of a predetermined number of bits of data, and said transmitting means includes a timing counter for counting the clock pulses generated by said clock pulse generator, and means responsive to said timing counter counting said predetermined number of clock pulses equal to the predetermined bits of data in a word of data for inhibiting the application of one of said clock pulses to said exclusive-OR modulo two adding means.

6. The data communication system claimed in claim 5 including means in said receiving means for detecting the inhibition of a clock pulse in said series of clock pulses to indicate the end of a word transmission.

7. The data communication system claimed in claim 5 wherein said inhibited clock pulse detector includes a retriggable one-shot circuit.

8. The data communication system claimed in claim 6 wherein said inhibited clock pulse detector includes a timing counter for counting said predetermined number of clock pulses transmitted.

9. The data communication system claimed in claim 6 where said inhibited clock pulse detector includes the combination of a retriggable one-shot circuit and a timing counter for counting said predetermined number of clock pulses transmitted.

* * * * *